United States Patent [19]

Watanabe et al.

[11] 4,409,633

[45] Oct. 11, 1983

[54] MN-ZN SINGLE CRYSTALLINE FERRITE HEAD AND A METHOD OF MAKING THE SAME

[75] Inventors: Hisashi Watanabe, Yokohama; Yoshiteru Urino, Tokyo; Shinichi Aotsu, Urawa, all of Japan

[73] Assignee: Akai Electric Company Limited, Tokyo, Japan

[21] Appl. No.: 250,557

[22] Filed: Apr. 3, 1981

Related U.S. Application Data

[62] Division of Ser. No. 18,768, Mar. 8, 1979, Pat. No. 4,285,894.

[30] Foreign Application Priority Data

Mar. 13, 1978 [JP] Japan .................................. 53-28873

[51] Int. Cl.³ .......................... G11B 5/14; G11B 5/22
[52] U.S. Cl. .................................... 360/127; 360/122
[58] Field of Search ................ 360/119, 122, 125, 127

[56] References Cited

U.S. PATENT DOCUMENTS

| | | | |
|---|---|---|---|
| 3,629,519 | 12/1971 | Hanak | 360/127 |
| 3,663,767 | 5/1972 | Shimotori | 360/127 |
| 3,739,445 | 6/1973 | Gabriel | 360/127 |
| 4,135,218 | 1/1979 | Nakamura | 360/127 |
| 4,320,427 | 3/1982 | Bogen | 360/122 |

FOREIGN PATENT DOCUMENTS 7901988 3/1979 Netherlands ..................... 360/127

*Primary Examiner*—Robert M. Kilgore
*Attorney, Agent, or Firm*—Oblon, Fisher, Spivak, McClelland & Maier

[57] ABSTRACT

A magnetic head for magnetic tape recording and reproducing apparatus utilizing Mn-Zn single crystalline ferrite at least for the tip core or front portion of a head core where an air gap is formed, wherein different phases are locally precipitated only at the region including the air gap at the central portion thereof where a running magnetic tape contacts during the recording and reproducing operation of the apparatus. The output of the head is considerably increased with the ferrite noise inherent in single crystalline ferrite heads kept at a low level, in comparison with the conventional single crystalline ferrite heads in which the precipitation of the different phases is not limited to the above-noted region of the head core. The head is made by a method comprising disposing a masking film or coating of metal or oxide over the whole surfaces of the head core except for the above-mentioned region and treating the core at a temperature of 1,000° C.–1,200° C. under an atmosphere with an oxygen density of less than 3%.

3 Claims, 4 Drawing Figures

MN-ZN SINGLE CRYSTALLINE FERRITE HEAD AND A METHOD OF MAKING THE SAME

This is a divisional of application Ser. No. 18,768, filed Mar. 8, 1979, now U.S. Pat. No. 4,285,894.

BACKGROUND OF THE INVENTION

1. Field of the Invention

The present invention relates to a Mn-Zn single crystalline ferrite head for use in magnetic tape recording and reproducing apparatus and to a method of making the same.

2. Description of the Prior Art

It is widely known that single crystalline ferrites, in particular Mn-Zn single crystalline ferrites, are desirably used as the magnetic core materials of the magnetic heads for magnetic tape recording and reproducing apparatus such as audio and video tape recorders, due to the reason that the single crystalline ferrites have the advantages of very high wear resistance and of superior magnetic properties, such as saturation magnetization, coercive force and permeability, and superior high frequency characteristics in comparison with alloyed materials, such as Permalloy and Sendust. However, such single crystalline ferrite heads inherently have a drawback in that they generate characteristic noise which is caused by rubbing against a magnetic tape, i.e. "ferrite noise". This ferrite noise occurs when the single crystalline ferrite heads are used in contact with a running magnetic tape and thereby results in a deterioration of the signal-to-noise ratio particularly in a reproduction mode of the apparatus.

In order to avoid the above described disadvantage of the ferrite noise inherent in the single crystalline ferrite heads, it has been proposed, for instance, as disclosed in Canadian Pat. No. 949,777 and a technical report entitled "Low Noise Manganese-Zinc Single Crystal Ferrite Heads" by Hisashi Watanabe, one of the inventors of the present invention, et al., which appeared on pages 497 through 500, of IEEE TRANSACTION ON MAGNETICS, Vol. Mag. 8, No. 3 for September 1972, to provide low noise Mn-Zn single crystalline ferrite heads. The above recited Canadian Pat. No. 949,777 and the technical report disclose that the ferrite noise generated in the Mn-Zn single crystalline ferrite heads is markedly reduced by dispersedly precipitating different phases such as $SnO_2$ phases in the Mn-Zn single crystalline ferrites so that pseudo grains, each diameter of which is less than 30 $\mu$m, are formed in the crystal. In this connection, reference may be made to a technical report entitled "Growth and Properties of Manganese Zinc Tin Ferrite Single Crystals" also by H. Watanabe et al., which appeared on pages Cl-51 through Cl-55, of JOURNAL DE PHYSIQUE, Vol. 38 for April 1977 and Japanese Pat. Nos. 894,305 (Publication No. SHO 52-24,998, and 894,306 (Publication No. SHO 52-24,799), wherein there is described in detail a method for precipitating the desired quantity of the different phases of $SnO_2$ in the Mn-Zn single crystalline ferrites.

Although the drawback of the ferrite noise inherent in the Mn-Zn single crystalline ferrite head was solved by precipitation of the different phases, such as $SnO_2$, phases into the ferrite crystal as described above, another problem has arisen from such precipitation in that the output of the head is reduced by the virtue of the fact that the effective permeability in the magnetic path of the head core is lowered by the different phases which are homogeneously precipitated in the whole magnetic path of the head core. However, the Mn-Zn single crystalline ferrites in which the different phases are homogeneously precipitated have been widely used as the magnetic head core material, since such low noise Mn-Zn single crystalline ferrite heads are in high demand in the field of magnetic tape recording and reproducing even though the permeability of the head core is somewhat sacrificed. That is to say, an implicit problem of the permeability in the improved low noise Mn-Zn single crystalline ferrite heads has hithertofor remained unsolved.

SUMMARY OF THE INVENTION

The present invention is based on the appreciation of the fact, which has been experimentally confirmed by the inventors, that the different phases need not be homogeneously precipitated in the whole ferrite head core for the purpose of reducing the ferrite noise, that the different phases precipitated only at a region including the air gap of the head at the central portion thereof where a running magnetic tape contacts the head are sufficient for noise reduction purposes, and that the magnetic resistance in the magnetic path of the ferrite head core is greatly reduced in the case when the different phases are locally precipitated only in the above-described region than when precipitated homogeneously in the whole ferrite head core. Needless to say, such decrement of the magnetic resistance means the increase of the effective permeability of the ferrite head core and of the output level of the head.

In view of the above-described appreciation and findings, the Mn-Zn single crystalline ferrite head according to the present invention comprises a head core of which at least a front portion or tip core, where an air gap is formed, is made of the Mn-Zn single crystalline ferrites in which different phases are locally precipitated only at a region including the air gap at the central portion thereof where there is contact with a running magnetic tape. The ferrite head according to the invention is made by a method comprising disposing a masking film of metals or oxide materials over the whole surface of the ferrite head core except for the above-described region and treating the head core at a temperature of 1000° C.–1,200° C. under an oxygen-containing oxyginic atmosphere with an oxygen density of less than 3%.

It is, therefore, an object of the present invention to provide an improved Mn-Zn single crystalline ferrite head characterized by low noise and high permeability in the magnetic path of the ferrite head core.

Another object of the present invention is to provide a method for making the above-mentioned Mn-Zn single crystalline ferrite head.

BRIEF DESCRIPTION OF THE DRAWINGS

The above and further objects and features of the present invention will be apparent when reference is made to the following description in conjunction with the accompanying drawings in which:

FIG. 2A is a front view of the Mn-Zn single crystalline ferrite block of E shape in section which is so shaped that a pair of the blocks may form the tip core of the head by means of bonding, cutting and slicing.

FIG. 2B is a sectional view of the ferrite block shown in FIG. 2A after the masking has been completed, and FIG. 2C is the same view as FIG. 2B, showing the precipitation of the different phases in the ferrite block.

DETAILED DESCRIPTION OF PREFERRED EMBODIMENTS

Figure 1:
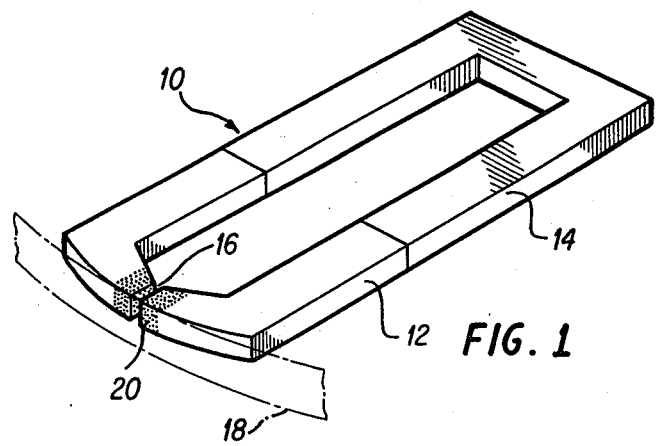
FIG. 1 is a perspective view of a head core of the Mn-Zn single crystalline ferrite head according to the invention, which is shown schematically and somewhat in exaggerated manner.

Referring to FIG. 1, there is shown a head core 10 of a Mn-Zn single crystalline ferrite head according to the present invention, which comprises a front core or tip core 12 made of Mn-Zn single crystalline ferrites and a rear core or body core 14 made of suitable known materials having high permeability, such as polycrystalline ferrites, Permalloy or Sendust. The tip core 12 and body core 14 are firmly bonded together by suitable means known in the art. An air gap 16 is provided in the front portion of the tip core 12, where a running magnetic tape 18 contacts in recording and reproducing operation of a magnetic tape recording and reproducing apparatus not shown. In the present invention, different phases, such as $SnO_2$, phases 20 schematically shown by small dots are locally precipitated only at a region including the air gap 18 at the central portion thereof, where the running tape 16 is in contact with the head.

The head core 10 shown in FIG. 1 is made as follows.

Figure 2A:
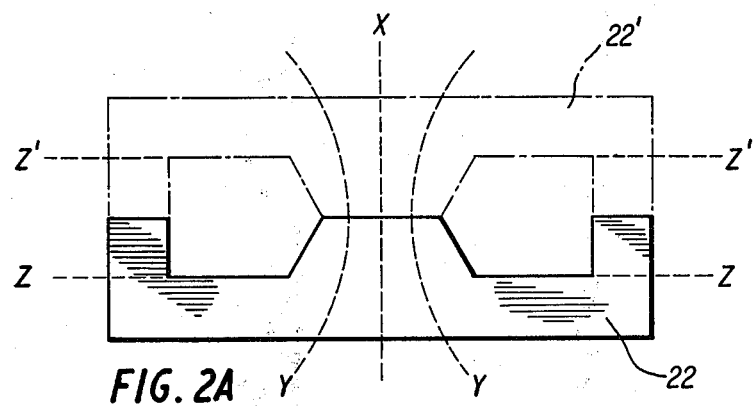
FIGS. 2A through 2C are drawings to explain the processes for locally precipitating the different phases in the Mn-Zn single crystalline ferrite head core, i.e.
Figure 2B:
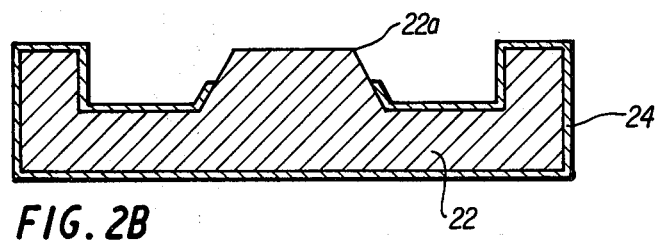
Figure 2C:
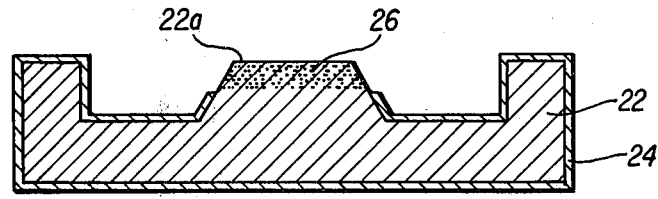

As shown in FIG. 2A, an E-shaped core block 22 is cut out from an ingot of the Mn-Zn single crystalline ferrite including Sn, namely Sn substituted Mn-Zn single crystalline ferrite. The ferrite head core block 22 is then coated by a coating or masking film 24 as shown in FIG. 2B made of metals or oxide materials so that the film 24 masks the whole surface of the head core block 22 except for a region 22a which is to be the region where the air gap 16 is formed when the tip core 12 as shown in FIG. 1 is finally made. The ferrite head core block 22 coated with the masking film 24 is then subject to heat treatment of 1,000° C.–1,200° C. under an oxygen-containing atmosphere with an oxygen density of less than 3%. By this heat treatment, different phases 26 of $SnO_2$, schematically shown by means of small dots in FIG. 2C, are precipitated only at the region 22a where the masking film 24 has been omitted. Thereafter, a pair of the ferrite head core blocks 22 are firmly bonded together by, for example, a known glass bonding method as shown in FIG. 2A. One of a pair of the blocks is shown in phantom by 22' in FIG. 2A. The bonded core block consisting of the blocks 22 and 22' are cut along a dotted line X and divided into two units. Each unit of the bonded core blocks in ground and polished so that it has a convex front surface shown by dotted line Y. The ferrite core unit is then sliced in the desired thickness in conformity with a track width on the magnetic tape. Finally, by cutting the central rear portion between lines Z and Z' out of each sliced core, the same tip core as the one shown in FIG. 1 by 12 is obtained.

The methods for making the Mn-Zn single crystalline ferrite head will be further described in detail hereinafter.

In one example of the method according to the present invention, all surfaces of the E-shaped Mn-Zn single crystalline ferrite head core including Sn were coated with a $SiO_2$ coating 24 of 1–6 μm in thickness. The $SiO_2$ coating 24 was formed by means of the well-known spattering method. The E-shaped head core 22 covered with the $SiO_2$ coating 24 was then treated at the temperature of 1,100° C.–1,200° C. under a nitrogen-containing atmosphere with an oxygen density of 3% and, as a result, the different phase of $SnO_2$ 26 was precipitated only at the region where the $SiO_2$ masking film 24 was not coated.

The experiments showed that the depth of the precipitation of the $SnO_2$ phases, as measured from the top surface of the uncoated region 22a of the ferrite head core 22, are controllable within the range between 0.1 mm and 1.5 mm in accordance with variations of the temperature of the heat treatment and the oxygen density of the atmosphere in which the heat treatment is performed.

The effective permeabilities μe and coersive forces Hc in the region where the different phases of $SnO_2$ are precipitated and the region where the different phases do not exist were as follows:

(1) The effective permeability and coersive force in the region where the different phases of $SnO_2$ are precipitated.
μe=930 (at the frequency of 10 KHz)
Hc=0.37 Oersted (2) The effective permeability and coersive force in the other region where the different phases do not exist.
μe=2,390 (at the frequency of 10 KHz)
Hc=0.10 Oersted As a result, the Mn-Zn single crystalline ferrite head utilizing the head tip cores made by the above-described method accomplished an increase of its output of 2 dB with the ferrite noise kept at a low level, in comparison with the conventional Mn-Zn single crystalline ferrite head utilizing the head tip cores in which the different phases are homogeneously precipitated in the whole magnetic path thereof.

In another example of the method according to the present invention, Cr was used as the coating or masking film in substitution for the $SiO_2$ used in the first example described hereinbefore. The Cr was coated over the surfaces of the E-shaped Mn-Zn single crystalline ferrite head core 22 shown in FIG. 2A by the spattering method so as to form a masking film 24 (FIG. 2B) of 1.5 μm in thickness all over the surface of the head core 22 except for the region 22a. The ferrite head core 22 coated with the masking film of Cr was then subject to the same heat treatment as mentioned in the explanation of the first example and, as a result, the $SnO_2$ phases of approximately 1.2 mm in depth as measured from the top surface of the region 22a, was precipitated in this region 22a. In this example, the $SnO_2$ phases were also precipitated in the remaining region other than the region 22a of the head core 22', but the depth of the precipitation as measured from the outer surfaces of the head core was only approximately 0.2 mm. It was confirmed, based on the fact that there exists a considerable difference between the depth of the precipitation of $SnO_2$ phases in the region 22a of the head core 22 and one in the remaining region, that the Cr was also usable as the masking film 24. In fact, the effective permeability at the frequency of 10 KHz in the region other than the region 22a was 1190 which is much more favourable value for increasing the magnetic characteristics and output of the head than that of 2390 in the case that the different phases are homogeneously precipitated in the ferrite head core.

The conditions of the temperature of 1,100° C.–1,200° C. and the oxygen density of less than 3% in the oxyginic or nitrogenic oxygen-containing or nitrogen-containing atmosphere in the heat treatment process in the examples of the method described above were selected, through experiment, so as to minimize deterioration and property changes of the $SnO_2$ or Cr coating and to suppress oxidation in the ferrite core in order to increase the effective permeability.

It should be noted that the coating for masking the ferrite head core, in order to locally precipitate the different phases therein, is not limited to that of $SiO_2$ or Cr formed by the spattering method. Various metals such as Pt may be used as the coating material and a vaporizing method may also be used in substitution for the spattering method for disposing the coating over the surface of the ferrite head core.

What is claimed as new and desired to be secured by Letters Patent of the United States is:

1. A magnetic head, for a magnetic tape recording and reproducing apparatus, comprising:
    at least one head core, at least a part of which is made of Mn-Zn single crystalline ferrites where an air gap is formed;
    wherein different phases are locally precipitated only at a region including the air gap at the central portion thereof where a running magnetic tape is contacted during the recording and reproducing operations of the tape recording and reproducing apparatus.

2. A magnetic head according to claim 1, wherein the Mn-Zn single crystalline ferrites are Sn substituted Mn-Zn single crystalline ferrites.

3. A magnetic head according to claim 1, wherein the different phases are $SnO_2$ phases.

* * * * *

UNITED STATES PATENT AND TRADEMARK OFFICE
CERTIFICATE OF CORRECTION

PATENT NO. : 4,409,633
DATED : OCTOBER 11, 1983
INVENTOR(S) : HISASHI WATANABE ET AL

It is certified that error appears in the above-identified patent and that said Letters Patent is hereby corrected as shown below:

Column 2, line 47, delete "oxyginic"

Column 3, line 53, delete "in" and insert therefor --is--.

Column 4, line 16, delete "coersive" and insert therefor --coercive--;

line 25, delete "coersive" and insert therefor --coercive--;

last line, delete "oxy".

Column 5, line 1, delete "ginic or nitrogenic".

Signed and Sealed this

Fourth Day of September 1984

[SEAL]

Attest:

GERALD J. MOSSINGHOFF

Attesting Officer

Commissioner of Patents and Trademarks